United States Patent [19]
Post

[11] Patent Number: 5,567,092
[45] Date of Patent: Oct. 22, 1996

[54] MILLING CUTTER PROVIDING MULTIPLE ADJUSTMENTS FOR INSERTS CARRIED THEREBY

[75] Inventor: Yngve Post, Sandviken, Sweden

[73] Assignee: Sandvik AB, Sandviken, Sweden

[21] Appl. No.: 299,063

[22] Filed: Aug. 31, 1994

[30] Foreign Application Priority Data

Sep. 6, 1993 [SE] Sweden ................................. 9302852

[51] Int. Cl.⁶ ..................................................... B23C 5/24
[52] U.S. Cl. .................. 407/38; 407/53; 407/46; 407/36
[58] Field of Search ................................ 407/38, 39, 44, 407/45, 46

[56] References Cited

U.S. PATENT DOCUMENTS

| | | | |
|---|---|---|---|
| 1,311,452 | 7/1919 | Lovejoy | 407/44 X |
| 2,586,955 | 2/1952 | Kaiser. | |
| 2,972,802 | 2/1961 | Stein. | |
| 3,644,050 | 2/1972 | Schiller | 407/39 X |
| 4,470,731 | 9/1984 | Erkfritz | 407/38 |
| 4,592,399 | 6/1986 | Rhodes | 407/38 X |
| 5,156,501 | 10/1992 | Pawlik et al. | 407/38 X |

FOREIGN PATENT DOCUMENTS

| | | | |
|---|---|---|---|
| 564397 | 7/1975 | Switzerland. | |
| 742385 | 12/1955 | United Kingdom. | |
| 984848 | 3/1965 | United Kingdom | 407/38 |

*Primary Examiner*—M. Rachuba
*Assistant Examiner*—Henry Tsai
*Attorney, Agent, or Firm*—Burns, Doane, Swecker & Mathis, L.L.P.

[57] ABSTRACT

A milling cutter body of basically cylindrical shape has a plurality of grooves of a circular cross-section each of which intersects the envelope surface of the cutter body. These grooves receive insert-carrying cartridges of a corresponding circular cross-section. Each cartridge is adjustably rotatable about an axis of its respective groove and is also axially adjustable along such axis. The groove axes are not parallel to the axis of rotation of the cutter body but are inclined to it. A precise positioning of the parallel land angle of the cutting edges is obtained by turning the cartridge about the groove axis and/or axially adjusting the cart ridge along that axis.

15 Claims, 3 Drawing Sheets

MILLING CUTTER PROVIDING MULTIPLE ADJUSTMENTS FOR INSERTS CARRIED THEREBY

BACKGROUND OF THE INVENTION

The present invention relates to a milling cutter body for chip-breaking machining.

A typical milling tool comprises a milling cutter body which is fastenable at the end of a rotating shaft in a predetermined relation to its rotational axis, and a plurality of cutting edges being carried at an outer periphery of the milling cutter body at a radial distance from the rotational axis, so that the cutting edges describe a circle around the central rotational axis of the shaft when the cutter body is rotated by the shaft. All parts of the milling cutter body are disposed axially and radially behind the cutting edges, so that these edges may unobstructedly come into contact with and machine the surface of a workpiece that is held by the machine in which the shaft rotates. Since the cutting edges are short, they perform a relatively narrow cutting, wherefore the tool is used with a transversal feed, i.e., the direction of feed is parallel to the machined surface of the workpiece.

In relation with milling cutters with mechanically fastened cutting inserts, it has turned out to be difficult to fasten the inserts with the required precision for obtaining a fine smooth surface on the workpiece and a long tool-life. In order to attain the required surface smoothness it is necessary that the cutting edges attain a possibly exact position, both radially and axially. Moreover, an exact positioning of the so called parallel land angle is very important for the fineness and smoothness of the produced surface. The "parallel land angle" is the angle between the operative cutting edge and the produced surface of the workpiece. This angle should be as small as possible; in other words, it should preferably be zero. However, it has proved to be very difficult to attain this, especially for all cutting edges of the cutter body.

Thus, a first object of the present invention is to provide a milling cutter body comprising cutting edges, whose parallel land angles can be finely adjusted with the highest possible precision.

A second object of the present invention is to make possible said fine adjustment of the parallel land angle at the same time as there is a possibility of finely adjusting the axial position of the cutting edges.

Another object of the present invention is to, when necessary, compensate for the inclination of the spindle of the machine.

SUMMARY OF THE INVENTION

According to the invention, these and further objects have in a surprising manner been attained by a milling cutter comprising a rotary body having first and second opposing sides interconnected by an annular peripheral envelope surface. Grooves are formed in the body and are arranged in an annular pattern about an axis of rotation of the body. The grooves intersect at least one of the sides of the body, and each groove has a curved first side wall defining an axis of the groove. The first side wall is of constant radius with reference to the groove axis. The groove axis intersects a plane of the one side of the body and extends non-parallel to the axis of rotation of the body. A cartridge is disposed in each groove and includes a curved second side wall shaped correspondingly to the first side wall so that the cartridge is adjustable rotatably about the groove axis. The cartridge includes a seat for receiving a cutting insert. A retainer is provided for retaining the cartridge in selected positions of rotational adjustment about the groove axis.

Preferably, each of the first and second side walls is shaped as a segment of a circle.

Preferably, manually rotatable elements are provided for adjusting each cartridge rotationally and axially with reference to the groove axis.

BRIEF DESCRIPTION OF THE DRAWINGS

For illustrative but non-limiting purposes, the invention will now be described in more detail in relation with a preferred embodiment as shown in the appended drawings.

DETAILED DESCRIPTION OF THE PREFERRED EMBODIMENT OF THE INVENTION

Figure 1:
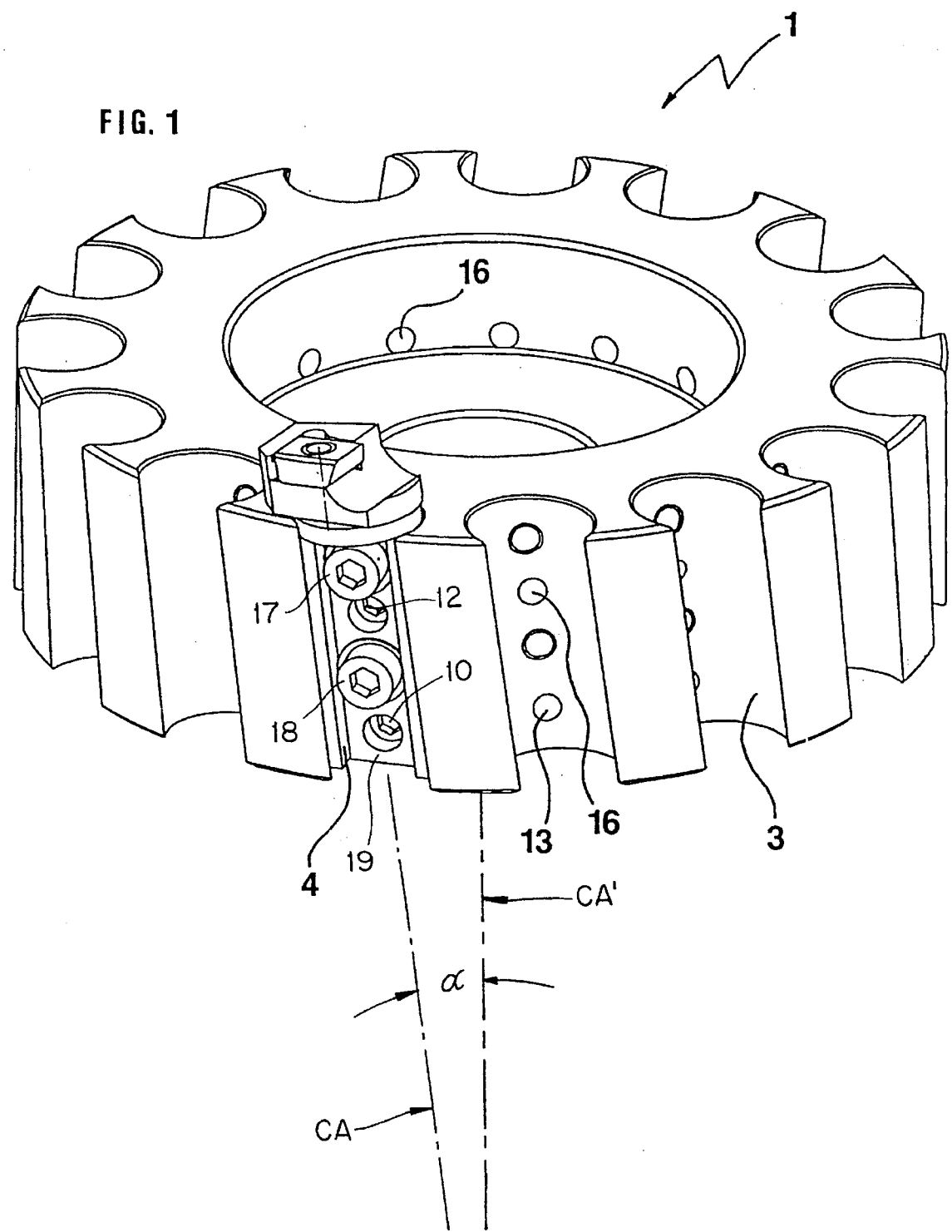
FIG. 1 shows a perspective view of the milling cutter body according to the invention obliquely from above, carrying a cartridge.
Figure 2:
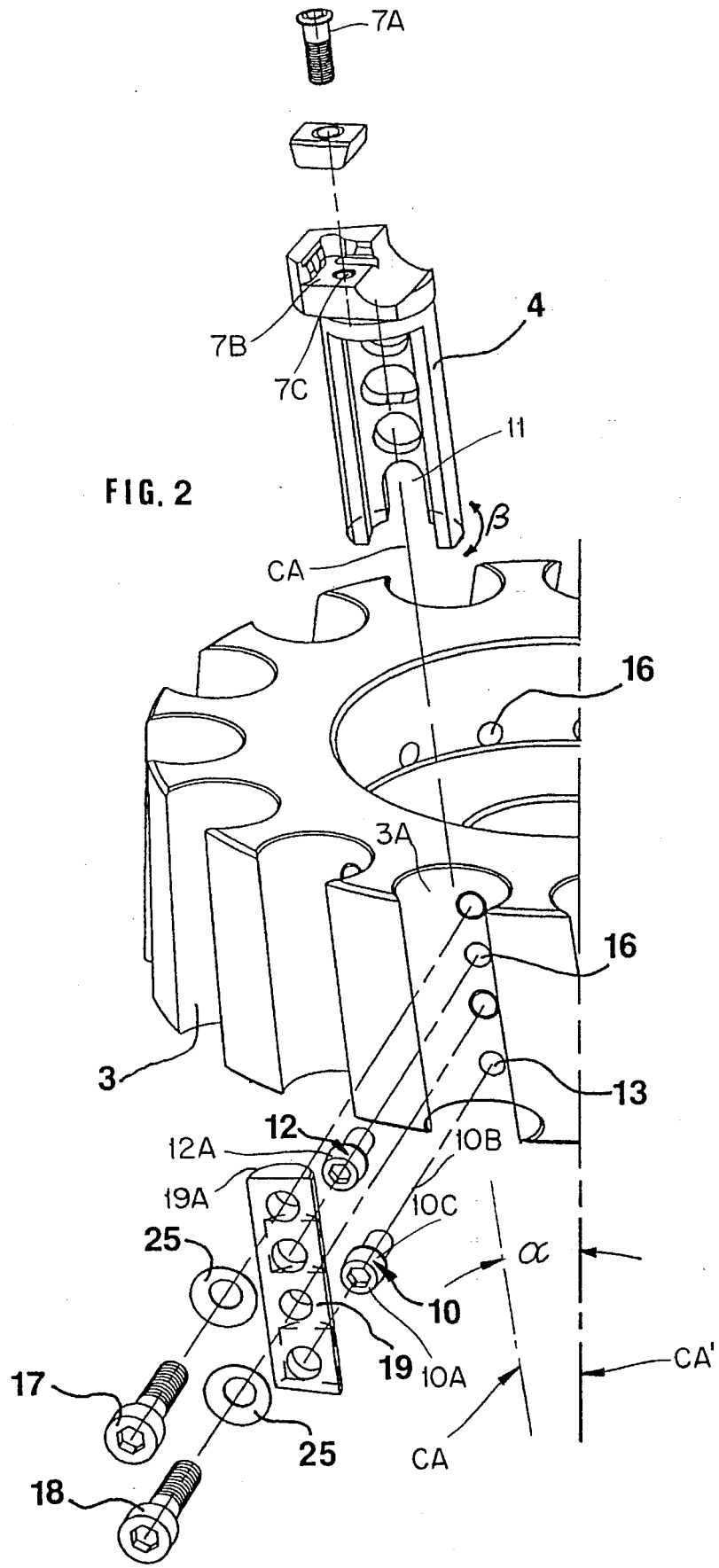
FIG. 2 shows a half of the milling cutter body of FIG. 1 in an exploded view.
Figure 3:
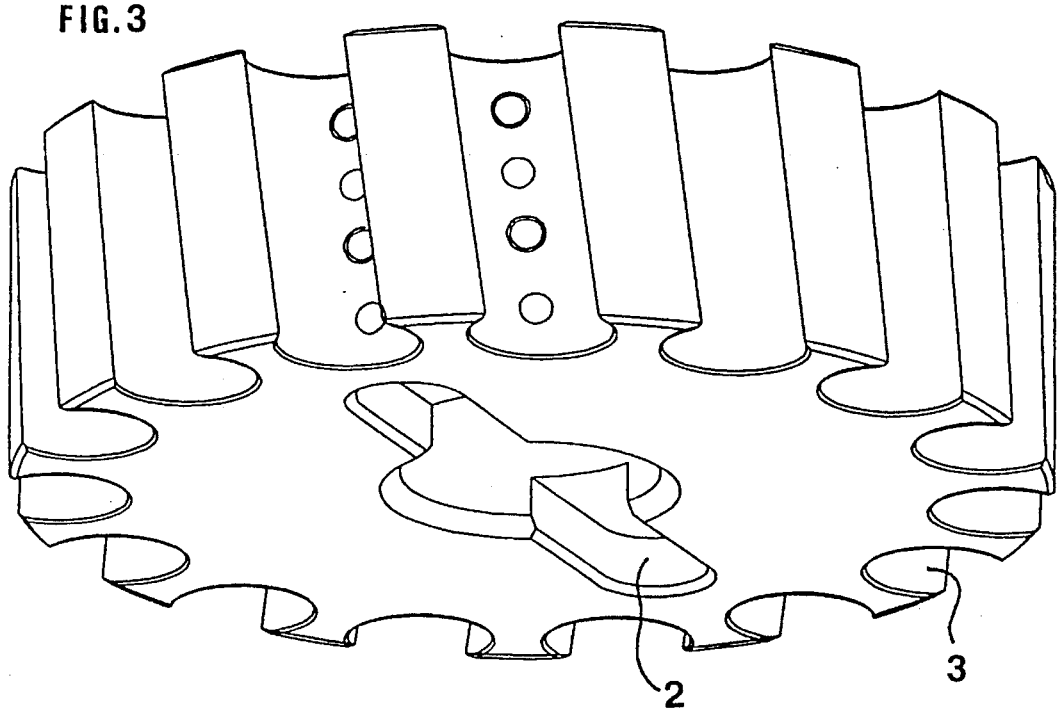
FIG. 3 shows a milling cutter body according to the invention in a perspective view obliquely from below.
Figure 4:
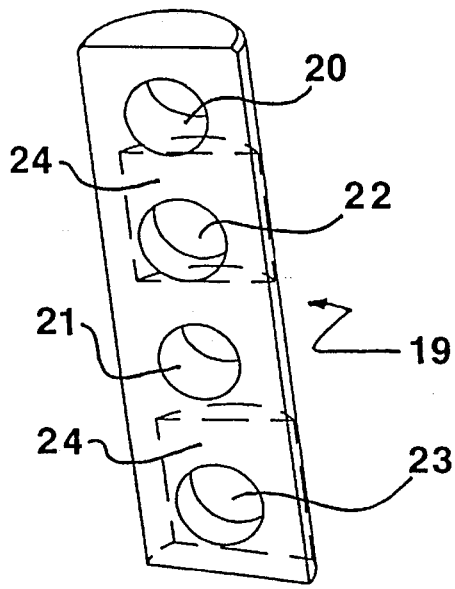
FIG. 4 shows a perspective view of a washer means according to the invention, for fastening a cartridge.

In FIGS. 1 to 3 a milling cutter body of generally cylindrical form is designated by reference numeral 1. Its diameter may suitably be between 50 and 700 mm, preferably between 70 and 500 mm and in particular between 80 and 350 mm. On the lower side of the cutter body is provided an elongate, diametrical holder recess 2 for fastening the cutter body in a rotating driving device. Along the cylindrical envelope surface of the cutter body are provided grooves 3 for accommodating insert-carrying cartridges 4. Each groove 3 has a curved surface 3A in the form of a segment of a circle, the axis of the circle defining a center axis CA of the cartridge. The cartridge 4 is similarly shaped. Each cartridge comprises a shaft portion 5 and a head 6, the latter being arranged to carry a cutting insert 7, which in known manner is fastened on the cartridge by a locking screw 7A, possibly with a shim placed underneath the cutting insert. The head 6 of the cartridge and the cutting insert 7 are dimensioned so that the operative cutting edge 8 (preferably the midpoint of the cutting edge) will intersect or at least come very near to the center axis CA of the cartridge. Thus, the distance between the center axis CA of the cartridge and said cutting edge in a direction perpendicular to the cutting edge, should not exceed 2 mm. Further, the head 6 of the cartridge is formed with a chip pocket 9 for effectively conveying the formed chips.

An essential feature of the present invention is that the grooves 3 are not parallel with the center axis (i.e., the axis of rotation) of the milling cutter body 1. Thus, as can be seen in FIGS. 1 to 3 the axes CA of these grooves are somewhat inclined in relation to the center axis of rotation CA' of the cutter body. Preferably, this inclination is only in a tangential direction and not in a radial one. This inclination makes possible a fine adjustment of the parallel land by turning the cartridge around its center axis CA relative to the body 1.

The inclination angle α of the axis CA of the cartridge in relation to the center axis CA' of the body 1 may vary between 1° and 15°, preferably between 2° and 10° and in particular between 3° and 8°. The axis α is viewed in a direction perpendicular to a tangent plane in which the cartridge axis CA lies. The turning angle of the cartridge around its own axis CA is designated β. The parallel land angle formed between the cutting edge and the surface of the workpiece, whose fine adjustment is the object of the present invention, is not shown in the figures but is designated as δ for the subsequent discussion. Between the three angles α, β and δ, the following mathematical interrelation exists:

$$\tan \delta = 2 \cdot \sin (\beta/2) \cdot \sin \alpha$$

By using this equation, the following values may be calculated:

| β | = | 1° | 1° | 1° |
|---|---|---|---|---|
| α | = | 5° | 6° | 10° |
| δ | = | 5'14" | 6'16" | 10'25" |

As may be seen from these values, a good approximation is that the numerical value for δ expressed in minutes corresponds about to the numerical value of α expressed in degrees, multiplied by the numerical value for β expressed in degrees. Generally, one may say that the angle of inclination α and the chosen turning angle β are chosen so that a wide range of adjustment for the cutting edge exists for evening out the angle tolerances of the system and compensating for the inclination of the spindle of the machine. In that way, it is more possible to achieve a zero, or nearly zero, parallel land angle. As is well known to the skilled artisan, the spindle is often positioned with a certain inclination to the surface of the workpiece in order to prevent the rear cutting edges from coming into contact with and scratching the machined surface.

Figure 5:
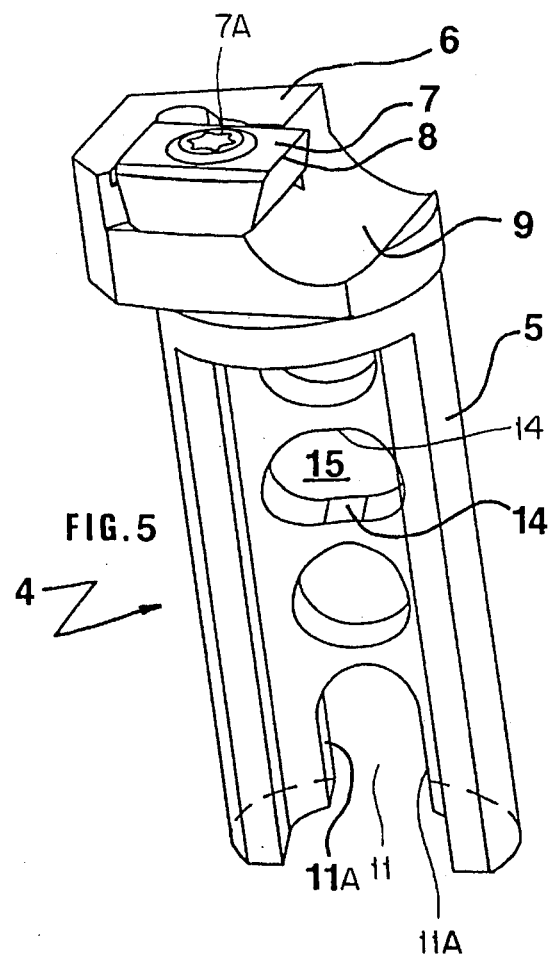
FIG. 5 shows a perspective view of an insert-carrying cartridge according to the invention.

The fine adjustment of the parallel land angle is effected by turning an actuator in the form of an eccentric tap 10, whose head 10A is eccentric relative to the axis of rotation 10B of the tap 10. The outer peripheral edge 10C of the head 10A is engageable simultaneously with two circumferentially spaced side walls 11A of a recess 11 formed in the cartridge 4 (see FIG. 5). Thus, the head 10A turns the cartridge around its central axis CA when the tap 10 is rotated about its axis 10B. These eccentric taps 10 are inserted in bottomed holes 13 in the cutter body. Further, the cartridge can be adjusted axially (i.e., along the axis CA) by an actuator in the form of an eccentric tap 12, whose head 12A bears simultaneously against upper and lower axially spaced planar surfaces 14 of cartridge holes 15 (see FIG. 5). These holes 15 are somewhat elongate in a circumferential direction in order to make possible the rotation of the cartridge about axis CA, in the same way as the recess 11 is elongate in a direction parallel to the cartridge axis CA in order to make possible the axial adjustment. The eccentric taps 12 are inserted into holes 16, which are through-holes in order to simplify the ejection of the eccentric tap when this is desired. The head of each eccentric tap 10, 12 may be provided with, e.g., a hexagonal hole to be turned by a hexagonal key.

When the desired axial and angular positions have been attained, the cartridge and thereby the cutting edge is fixed by two fastening screws 17 and 18, for instance, by a hexagonal key. A washer member 19 is provided between the heads of screws 17, 18 and the cartridge 4, the function of said washer member being to compensate for the bias which would otherwise be caused under the screw heads when the cartridge is turned. Thus, the washer guides the cartridge during axial and rotational movements thereof. The side 19A of the washer member facing radially inwardly i.e., toward the central axis CA' of the cutter body is convex i.e., shaped as a segment of a circle and bears against a correspondingly shaped concave surface of the cartridge 4. Each washer member 19 is formed with four through-holes: two holes 20,21 for accommodating passage of the fastening screws 17,18 and two holes 22,23 providing access to the eccentric taps 10,12. Since holes 22,23 have a smaller diameter than the heads of the eccentric taps, the taps are prevented from escaping radially outwardly under centrifugal force during a cutting operation. Each tap is thus restrained along its axis by the washer member 19 and the surface 3A. Further, the surface 19A of the washing member 19 is formed with two recesses 24 in order to accommodate the portions of the heads 10A,12A of the eccentric taps which protrude out of the cartridge recess 11 and the cartridge hole 15, respectively. When the screws 17, 18 are tightened, the cartridge 4 becomes clamped between the washer 19 and the surface 3A of the groove. Between the head of each screw 17, 18 and the washer, there is provided a cup spring 25 which has the purpose of maintaining a friction force on the cartridge 4 when slightly slacking off the screw 17 or 18, which force is of the right magnitude for enabling an adjustment of the cartridge by the two eccentric taps without play (looseness).

By means of the above described eccentric taps, a very precise angular and axial positioning of the operative cutting edge can be attained. However, also other ways of positioning the cutting-edge are feasible; even a direct manual positioning is possible. It may be easily checked that the desired position has actually been attained, e.g., by a "thousandth gauge".

By the thus described invention a hitherto unattained precision when adjusting the parallel land angle has been achieved.

What is claimed is:

1. A milling cutter comprising:

a rotary body having first and second opposing sides interconnected by an annular peripheral envelope surface, grooves formed in said body and arranged in an annular pattern about an axis of rotation of said body, said grooves intersecting at least one of said sides of said body, and each groove having a curved first side wall defining an axis of said groove, said first side wall being of constant radius with reference to said groove axis, said groove axis intersecting respective planes of said sides and extending non-parallel to said axis of rotation of said body;

a cartridge disposed in each groove and including a curved second side wall shaped correspondingly to said first side wall so that said cartridge is adjustable rotatably about said groove axis, said cartridge including a seat for receiving a cutting insert;

a retainer for retaining the cartridge in selected positions of rotational adjustment about said groove axis;

a manual actuator for adjustably rotating each of said cartridges about its groove axis, and a manual actuator for axially displacing each of said cartridges along its groove axis;

wherein each manual actuator for axially displacing a cartridge comprises a rotary element having an eccentric head disposed in contact simultaneously with surfaces of said cartridge which are spaced apart in a direction parallel to said cartridge axis, said head of said rotary element being rotatable about an axis oriented perpendicular to said axis of rotation of said body.

2. A milling cutter according to claim 1, wherein each of said first and second side walls is shaped as a segment of a circle.

3. The milling cutter according to claim 1, wherein each groove axis lies in a plane oriented tangentially with respect to said envelope surface.

4. The milling cutter according to claim 1, wherein each groove axis forms an angle of from 1 to 15 degrees with said axis of rotation of said body.

5. The milling cutter according to claim 4, wherein said angle is from 2 to 10 degrees.

6. The milling cutter according to claim 4, wherein said angle is from 3 to 8 degrees.

7. The milling cutter according to claim 2, wherein each of said grooves intersects said envelope surface so that said grooves are open in a radially outward direction.

8. The milling cutter according to claim 3, wherein each groove axis is oriented at an angle of from 1–15 degrees with respect to said axis of rotation of said body.

9. The milling cutter according to claim 1, wherein each of said grooves intersects both of said first and second sides.

10. A milling cutter comprising:
- a rotary body having first and second opposing sides interconnected by an annular peripheral envelope surface, grooves formed in said body and arranged in an annular pattern about an axis of rotation of said body, said grooves intersecting at least one of said sides of said body, and each groove having a curved first side wall defining an axis of said groove, said first side wall being of constant radius with reference to said groove axis, said groove axis intersecting respective planes of said sides and extending non-parallel to said axis of rotation of said body;
- a cartridge disposed in each groove and including a curved second side wall shaped correspondingly to said first side wall so that said cartridge is adjustable rotatably about said groove axis, said cartridge including a seat for receiving a cutting insert;
- a retainer for retaining the cartridge in selected positions of rotational adjustment about said groove axis;
- a manual actuator for adjustably rotating each of said cartridges about its groove axis;
- a manual actuator for axially displacing each of said cartridges along its groove axis;
- wherein said seat includes a seat surface disposed at an axial end of said cartridge and extending transversely to said axis, a threaded hole extending into said seat surface for receiving a threaded insert locking screw.

11. A milling cutter comprising:
- a rotary body having first and second opposing sides interconnected by an annular peripheral envelope surface, grooves formed in said body and arranged in an annular pattern about an axis of rotation of said body, said grooves intersecting at least one of said sides of said body, and each groove having a curved first side wall defining an axis of said groove, said first side wall being of constant radius with reference to said groove axis, said groove axis intersecting respective planes of said sides and extending non-parallel to said axis of rotation of said body;
- a cartridge disposed in each groove and including a curved second side wall shaped correspondingly to said first side wall so that said cartridge is adjustable rotatably about said groove axis, said cartridge including a seat for receiving a cutting insert;
- a retainer for retaining the cartridge in selected positions of rotational adjustment about said groove axis;
- a manual actuator for adjustably rotating each of said cartridges about its groove axis;
- a manual actuator for axially displacing each of said cartridges along its groove axis;
- wherein said cartridge includes a concave surface facing radially outwardly and arranged coaxially with said axis, said retainer comprising a washer having a convex surface facing radially inwardly, said convex surface shaped correspondingly to, and contacting, said concave surface, and threaded fasteners extending through said retainer and said washer and being threadedly secured in said rotary body.

12. The milling cutter according to claim 1, wherein said retainer includes at least one fastening screw interconnecting each cartridge with said body for fastening said cartridge in its adjusted positions.

13. The milling cutter according to claim 12 further including a washer disposed between a head of said fastening screw and a respective cartridge, for clamping said cartridge against said first side wall, said washer having a curved surface bearing against a correspondingly curved surface of a cavity of said cartridge.

14. The milling cutter according to claim 10, further including a cutting insert mounted on said seat surface, said cutting insert including a cutting edge, said axis of a respective groove substantially intersecting said cutting edge.

15. The milling cutter according to claim 14, wherein said groove axis substantially intersects said cutting edge at a midpoint of said cutting edge.

\* \* \* \* \*